UNITED STATES PATENT OFFICE.

HEINRICH LÜERS, OF MUNICH, GERMANY.

PROCESS OF MANUFACTURING A COLORING MATTER FOR BEER.

1,418,945.  Specification of Letters Patent.  Patented June 6, 1922.

No Drawing.  Application filed February 18, 1921. Serial No. 446,200.

*To all whom it may concern:*

Be it known that I, HEINRICH LÜERS, a citizen of the German Republic, and resident of Munich, Germany, have invented a certain new and useful Improved Process of Manufacturing a Coloring Matter for Beer and the like (for which I have obtained a patent in Germany, No. 347,891, application date Dec. 17, 1919), of which the following is a specification.

For manufacturing the dark beers high-kilned malt is employed, as is known, in large quantities. It differs from ordinary malt by being kilned at comparatively high temperatures whereby certain roasting-products are produced which later-on, in their turn, produce the dark color of the beer.

The roasting-process entails a considerable loss in valuable grain-substance (starch, sugar, albumin-bodies), which is not in a favorable ratio to the coloring-power of the high-kilned malt.

It has also already been tried to produce extracts for coloring worts or beer, and beer-wort has, for this purpose, been mixed with decomposed yeast and the mixture has been left to itself at a temperature of 40–50° C. The mass obtained was then concentrated by evaporation and roasted in an open cylindrical vessel at temperature of from 200 to 250° C. Then the roasted mass was dissolved and filtered. The extract thus obtained is mixed with empyreumatic products. Its coloring-power is by no means particularly great.

It has also already been proposed to manufacture a coloring-matter for beer by merely concentrating malt-wort viz by inspissating the malt-wort to the consistency of syrup in a suitable apparatus under vacuum, and subjecting it at the same time to a temperature of 115–125°, then to an appropriate pressure. The coloring-syrup thus obtained has, however, but a comparatively moderate coloring-power which is insufficient in most cases. Moreover, the process is rather circumstantial because of the application of a higher pressure, and is also expensive on account of the high costs of the repairs caused by the apparatus mentioned.

Now, it has been found that a coloring-matter for beer may be produced which by far excels the known high-kilned malt, as well as the coloring-syrups, and permits of a great saving of material when utilized in the brewing-process, by starting not solely from malt, as has always hitherto been done, but utilizing also the malt-germs. The inventor has ascertained the fact that when co-utilizing extracts of the malt-germs for manufacturing the improved coloring-matter in question a product of great coloring-power is obtained which also as to its aroma and foam-maintaining power of the beers produced with its aid proves considerably more advantageous than the known high-kilned malt.

Under the term malt in the sense of this invention I understand germed and kiln-dried cereals, although as regards conditions in the German brewing-industry first-of all barley-malt is concerned.

To carry the novel process into practice, kiln-dried malt is saccharified in known manner and the sugar-solution separated from the residues. In the same manner an appropriate quantity of malt-germs is extracted by water and the extract separated from the exhausted germs. The two solutions thus obtained are mixed with each other and the mixture is inspissated by evaporation to the consistency of syrup. The product obtained is then heated to 100° C. and kept on this temperature for an appropriate time. The length of the latter depends upon the degree of heat applied. A temperature of over 150° C. ought to be obviated, as it entails severe decompositions which render the final product unsuited for the purpose in view.

Another form of execution of the procedure consists in steeping the brewing-malt or the green malt directly into an extract of malt-germs. The thus steeped malt is then saccharified at 70°, after which the temperature is raised to 100°. The final product obtained by this manner of operation is a caramel- or coloring-malt, the coloring power of which is by far greater than that of caramel- or coloring-malt of the usual make. Besides, a saving of at least 15% in the barley consumed for producing the coloring-malt is obtained and the malt-germs used in the process keep their entire food-valve. Nothing else is necessary but to dry them after the extraction.

By making use of the malt-germs, which up to now could be utilized merely as food, for the manufacture of a coloring-matter for beer and the like, a very important progress in the brewing-industry is made, it being rendered possible to produce a materially better coloring-matter and, at the same time, to save a considerable amount of barley.

The coloring-matter obtained by the improved process in question is, of course, applicable not solely for beer, but it may be profitably employed for all purposes for which it is suited; concerning beverages, mention may be made of cognac and vinegar, but besides drinkables also eatables may be treated with the improved product in question.

For certain purposes the sugar-solution to be mixed with the aqueous extraction of the malt-germs might be manufactured from starch and sugar of other origin. In this case the starch can, for instance, be saccharified after one of the known methods and the solution obtained mixed with the extract of the malt-germs, after which the mixture is further treated in the manner above described.

To give a practical example: 1 kilo of light or dark bruised or crushed malt is saccharified with from 3 to 4 liters of water at from 60 to 70° C.; then the wort is separated from the exhausted malt and the sugar contained in the latter washed out in the highest-possible measure. The filtrate is mixed with another filtrate obtained by covering ⅓ kilo of malt-germs with water, digesting these latter during one night, and separating the exhausted germs from the liquid. The mixture of the two filtrates is inspissated by evaporation to the consistency of syrup and the resulting mass is heated in a thermostatically regulated receptacle to about 115° C. and kept upon this temperature for from 2 to 3 hours. The brittle product is employed either directly or after dissolving in water and filtering.

It lies in the nature of the thing that the products obtained by the processes described are not all the same; their quality or condition varies in dependency upon the circumstances existing or arising during the treatment of the base-materials. But the final product excels considerably at all events the high-kilned malt as hitherto employed as coloring-matter for beer and the like, the advantage lying on the one side in its coloring power, on the other side in the absence of disagreeable accompanying substances.

Having now described my invention, what I desire to secure by a patent of the United States is:

1. The process of manufacturing a coloring-matter for beer and the like, consisting in mixing a sugar-solution with an aqueous extract of malt-germs, thickening the mixture to the consistency of syrup by evaporation, and keeping the concentrate upon a temperature of approximately 100° C. for an appropriate time.

2. The process of manufacturing a coloring-matter for beer and the like, consisting in saccharifying starch, mixing it with an aqueous extract of malt-germs, thickening the mixture to the consistency of syrup by evaporation, and keeping the concentrate upon a temperature of approximately 100° C. for an appropriate time.

3. The process of manufacturing a coloring-matter for beer and the like, consisting in mixing sugar-solution obtained from saccharified kiln-malt with an aqueous extract of malt-germs, thickening the mixture to the consistency of syrup by evaporation, and keeping the concentrate upon a temperature of approximately 100° C. for an appropriate time.

4. The process of manufacturing a coloring-matter for beer and the like, consisting in providing a sugar-solution and an aqueous extract of kiln-malt, mixing said solution and said extract with each other, thickening the mixture to the consistency of syrup by evaporation and keeping the concentrate upon a temperature of approximately 100° C. for an appropriate time.

5. The process of manufacturing a coloring-matter for beer and the like, consisting in steeping brewing-malt in an aqueous extract of malt-germs, saccharifying the mixture at 70° C. and increasing the temperature to over 100° C., substantially as described.

6. The process of manufacturing a coloring-matter for beer and the like, consisting in steeping green-malt in an aqueous extract of malt-germs, saccharifying the mixture at 70° C. and increasing the temperature to over 100° C., substantially as described.

In testimony whereof I have signed this specification in the presence of two witnesses.

Dr. HEINRICH LÜERS.

Witnesses:
 GEORG DIPPOLD,
 JOSEF MEINDLE.